United States Patent [19]

Kojima

[11] Patent Number: 5,233,414
[45] Date of Patent: Aug. 3, 1993

[54] COLOR IMAGE PROCESSING APPARATUS

[75] Inventor: Toshihiro Kojima, Tokyo, Japan

[73] Assignee: Canon Kabushiki Kaisha, Tokyo, Japan

[21] Appl. No.: 852,504

[22] Filed: Mar. 17, 1992

Related U.S. Application Data

[63] Continuation of Ser. No. 280,150, Dec. 5, 1988, abandoned.

[30] Foreign Application Priority Data

Dec. 8, 1987 [JP] Japan .................. 62-310520

[51] Int. Cl.$^5$ ............................. H04N 1/46
[52] U.S. Cl. ......................... 358/80; 358/76
[58] Field of Search ........... 358/75, 80, 78, 401, 358/447, 32, 450, 76, 448, 452, 453, 454, 455, 456, 457, 458, 462, 463, 464, 467, 111

[56] References Cited

U.S. PATENT DOCUMENTS

| | | | |
|---|---|---|---|
| 4,476,497 | 10/1984 | Oshikoshi | 358/298 |
| 4,636,845 | 1/1987 | Alkofer | 358/447 |
| 4,661,843 | 4/1987 | Sekizawa et al. | 358/80 |
| 4,667,228 | 5/1987 | Kawamura et al. | 358/80 |
| 4,737,856 | 4/1988 | Shimizu | 358/285 |
| 4,769,695 | 9/1988 | Terashita | 358/80 |
| 4,782,390 | 11/1988 | Hayashi et al. | 358/78 |
| 4,837,450 | 6/1989 | Satomura | 250/571 |
| 4,845,549 | 7/1989 | Someya | 358/80 |
| 4,891,692 | 1/1990 | Outa | 358/75 |
| 4,896,208 | 1/1990 | Moriya et al. | 358/78 |
| 4,903,145 | 2/1990 | Funada | 358/462 |
| 4,935,809 | 6/1990 | Hayashi et al. | 358/75 |
| 4,965,662 | 10/1990 | Shiota | 358/78 |

FOREIGN PATENT DOCUMENTS

3629793A1  3/1988  Fed. Rep. of Germany .
2124055A   2/1984  United Kingdom .

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A color image processing apparatus comprises: a reading device to read color image data of a color original image; a discriminating circuit to discriminate color tones of a plurality of areas of the color original image; a correction circuit to perform the color tone correction every area for the color image data which is output from the reading device on the basis of a discrimination output of the discriminating circuit or on the basis of an output of the reading device; and a generating circuit to generate signals corresponding to the plurality of areas. With this apparatus, by discriminating the color tones of a plurality of areas, the color tones of the areas are accurately corrected and a good copy image can be obtained. The correction data for a color film of a plurality of frames of different color tones can be made by a single reading operation.

81 Claims, 9 Drawing Sheets

F I G. 10
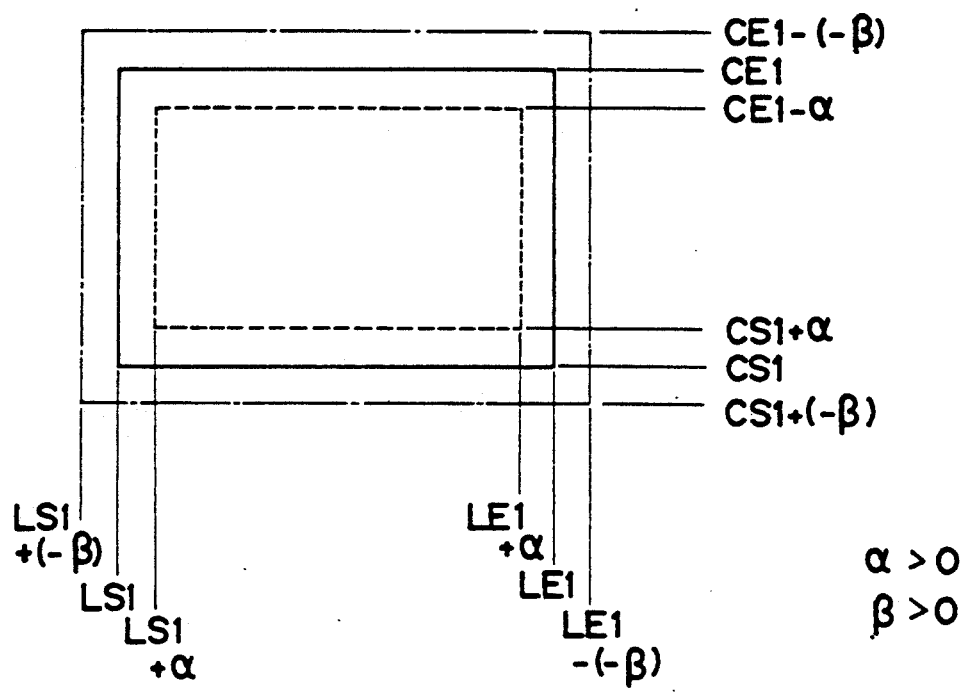
α > 0
β > 0
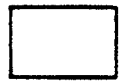 IDEAL FRAME AREA
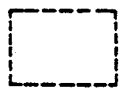 LEVEL CORRECTION PARAMETER CALCULATION AREA
 CORRECTION AREA

COLOR IMAGE PROCESSING APPARATUS

This application is a continuation of application Ser. No. 07/280,150 filed Dec. 5, 1988, now abandoned.

BACKGROUND OF THE INVENTION

1. Field of the Invention

The present invention relates to a color image processing apparatus for processing a color image which was read.

2. Related Background Art

In an image reading apparatus for reading a color image and converting into color image data, hitherto, there has already been known an apparatus in which in order to eliminate the influences by the color and temperature of, e.g., an illuminating light, the color tone of the color image data obtained is corrected, thereby always obtaining the image data having a proper color balance.

However, in the above apparatus, in the case of reading a plurality of images in a lamp, the color tones of the images are not always equal. Therefore, there is a problem such that when the color tone of each image is corrected in the same manner, there is a possibility such that a certain image looks like a slightly blue or red image as compared with the other images.

Such a problem is similarly caused in the case where a plurality of color images are read and are subjected to, for instance, a color copying process or the like.

SUMMARY OF THE INVENTION

It is an object of the present invention to solve the foregoing problems and to provide a color image processing apparatus which can preferably process a plurality of images of different color tones.

Another object of the invention is to accurately correct the color tone of each area by discriminating the color tone of each of a plurality of areas.

Still another object of the invention is to enable the color tones of a plurality of areas to be differently corrected in accordance with each color tone.

Still another object of the invention is to perform the good color tone correction even when an original is put at a slightly deviated position.

Still another object of the invention is to provide a color copying apparatus in which an original having a plurality of areas of different color tones is read and a good copy image can be obtained.

Still another object of the invention is to provide a color film reading apparatus which reads a plurality of color films and can preferably process the plurality of color films.

Still another object of the invention is to provide a color film reading apparatus for making correction data for color films of a plurality of frames by a single reading operation.

The above and other objects and features of the present invention will become apparent from the following detailed description and the appended claims with reference to the accompanying drawings.

BRIEF DESCRIPTION OF THE DRAWINGS

FIG. 10 is a diagram for explaining a level correction parameter calculation area and a level correction area in each frame.

DETAILED DESCRIPTION OF THE PREFERRED EMBODIMENT

In an embodiment of the present invention which will be explained hereinbelow, an explanation will be made with respect to an image processing apparatus in which image data on films of a plurality of frames are read in a lump, the color tones and image concentrations of the frames are independently changed, and a copy image can be obtained. However, the invention is not limited to such an apparatus. That is, an object to be read is not limited to an image recorded on a film to be read by a transmitting light. It is possible to use an image recorded on a recording paper to be read by a reflecting light or the like. It is not always required to obtain a copy image. For instance, image data can be also stored into a memory device or the like.

An embodiment of the invention will now be described hereinbelow with reference to the drawings.

Figure 2:
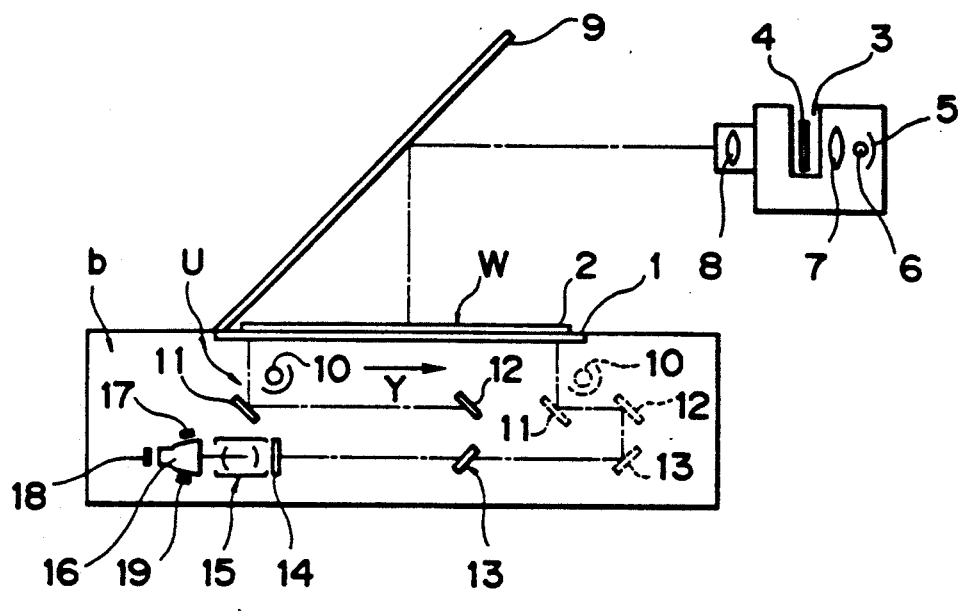
FIG. 2 is a cross sectional explanatory diagram of an image pickup apparatus according to an embodiment of the invention.

FIG. 2 is a cross sectional view showing an arrangement of an image pickup apparatus to read information on an original in the embodiment of the invention. In FIG. 2, reference numeral 1 denotes an original glass base plate; 2 is a film carrier which is set at a fixed position on the upper surface of the original glass base plate 1; and 3 is a slide projector serving as illuminating means. The slide projector 3 is arranged so that the light which is emitted therefrom illuminates the whole film carrier 2.

Figure 5:
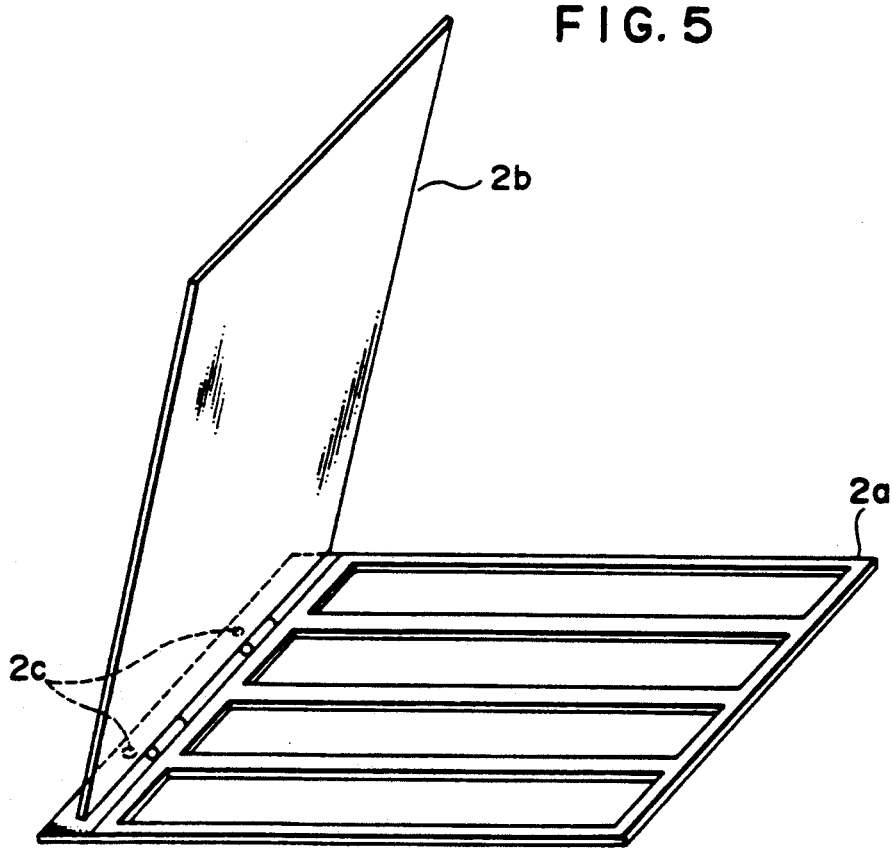
FIG. 5 is a perspective view of a film carrier according to an embodiment of the invention.

The film carrier 2 comprises: a lower plate 2a having holes which are cut as shown in, e.g., FIG. 5 and each of which has a size as large as a film; a Fresnel lens 2b to press the films so as to be closely come into contact with the upper surface of the original glass base plate 1; and holes 2c formed to fix the carrier. With this construction, each frame photographed on the films is located at a predetermined position on the original glass base plate 1.

Reference numeral 5 denotes a reflecting mirror provided in the slide projector 3; 6 is a light source; 7 a capacitor lens to converge the lights emitted from the light source 6; 8 a projecting lens to project the light converged by the capacitor lens 7; and 9 a mirror arranged so as to face the projecting lens 8. The mirror 9 is attached at a proper angle of inclination so as to downwardly reflect the light which passed through the projecting lens 8. Reference numeral 10 denotes a halogen lamp serving as an illuminating light source in the case of copying a reflecting color original which is put on the original glass base plate 1; 11, 12, and 13 denote first to third reflecting mirrors; 14 a near infrared rays cutting filter which is arranged in front of an image pickup lens 15; 16 a three-color prism which is arranged behind the image pickup lens 15 and separates the blue (B), green (G), and red (R) colors; and 17, 18, and 19 charge coupled devices (hereinafter, referred to as CCDs) serving as image pickup means for respectively reading the color separation light images of blue, green, and red.

The image pickup apparatus shown in FIG. 2 reads the color separation light images of blue, green, and red by one line in the main scanning direction by the CCDs 17, 18, and 19. A scanning unit U consisting of the halogen lamp 10 and first mirror 11 is moved in the Y direction (subscanning direction) shown in FIG. 2, thereby reading the next line by the CCDs 17, 18, and 19. The image pickup apparatus shown in FIG. 2 performs the reading operation every line a plurality of times, thereby reading the color original information.

Figure 3:
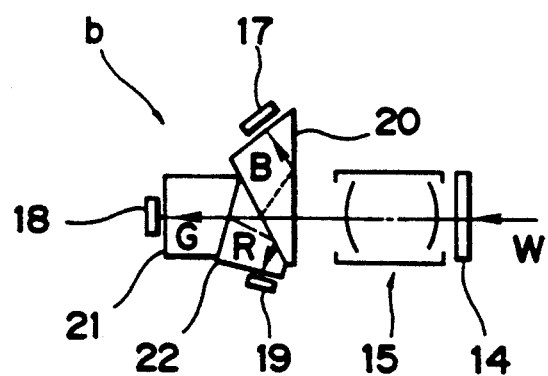
FIG. 3 is a cross sectional explanatory diagram of a three-color separating prisms according to an embodiment of the invention.

FIG. 3 is a partial enlarged cross sectional view near the 3-color separating prism 16 and shows a state in which the lights from the slide projector 3 is separated to light images B, G, and R by prisms 20, 21, and 22, respectively.

The halogen lamp 10 and first mirror 11 shown in FIG. 2 construct the scanning unit U. The scanning unit U is supported by a supporting member (not shown). The scanning unit U is arranged so as to be moved in the Y direction in the diagram along a guide rail (not shown) and to subscan the original image which is projected onto the original glass base plate 1. The second and third mirrors 12 and 13 are integrally supported by a supporting member (not shown) and are arranged so as to be likewise moved in the Y direction in the diagram along a guide rail (not shown). The moving direction in the Y direction of each of the scanning unit U and the second and third mirrors 12 and 13 is determined in a manner such that even when the halogen lamp 10 and first mirror 11 are moved to the positions indicated by alternate long and short dash lines in the diagram or even at any scanning point on the original glass base plate 1, the optical path length until the image pickup lens 15 is held to a predetermined value.

Figure 4:
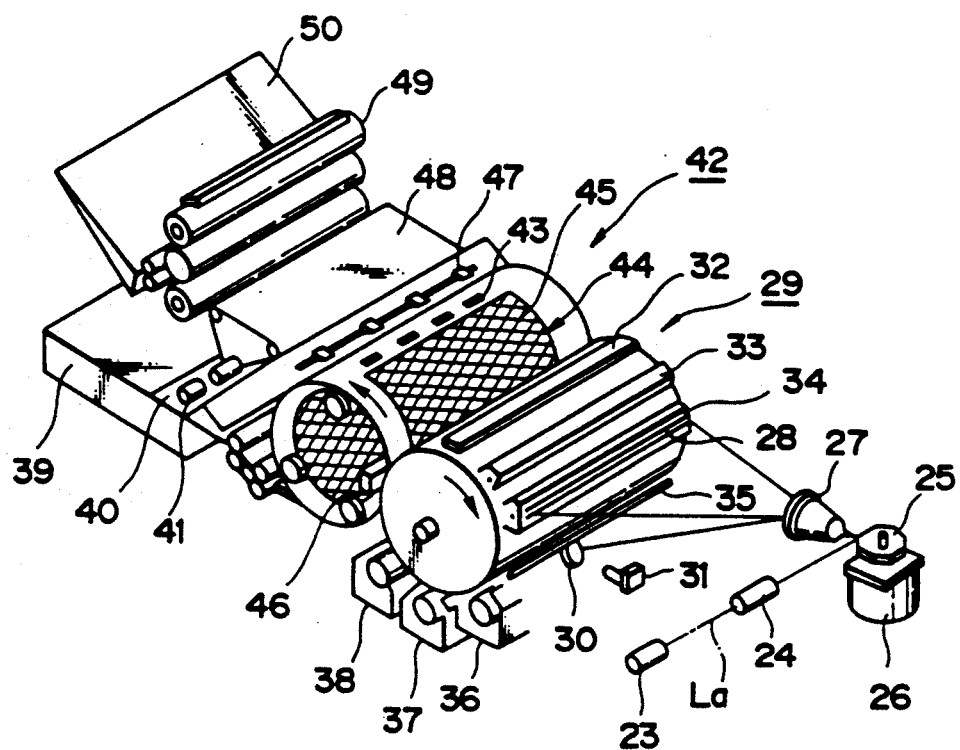
FIG. 4 is a perspective view of a recording section according to an embodiment of the invention.

FIG. 4 shows a color laser beam printer to output image information read out by an image pickup apparatus to read the original information shown in FIG. 2.

In the diagram, reference numeral 23 denotes a semiconductor laser serving as recording means for emitting a laser beam $L_a$. The laser beam $L_a$ is modulated by the signal based on the signals obtained from the CCDs 17 to 19 shown in FIG. 2. Reference numeral 24 denotes a beam expander to expand the modulated laser beam $L_a$ to a predetermined beam diameter; 25 indicates a polyhedron reflecting mirror to reflect the laser beam $L_a$ transmitted through the beam expander 24; 26 a constant velocity rotating motor for rotating the polyhedron reflecting mirror 25, thereby allowing the laser beam $L_a$ to be substantially horizontally scanned, 27 an image forming lens having the f-Q characteristics; and 28 a slit to pass the laser beam $L_a$ transmitted through the image forming lens 27. The slit 28 is provided for a secondary electrifier 34, which will be explained hereinlater. Reference numeral 29 denotes a photosensitive drum for forming an image of the laser beam $L_a$ transmitted through the slit 26 as a spot light; 30 indicates a mirror which is arranged near the photosensitive drum 29 and reflects a part of the laser beam $L_a$ transmitted through the image forming lens 27; and 31 a laser beam detector to detect the laser beam $L_a$ reflected by the mirror 30. To give predetermined light information to the photosensitive drum 29, the laser beam detector 31 outputs a beam detection signal as a control signal so as to modulate the semiconductor laser 23 at a proper timing.

The photosensitive drum 29 has a CdS photosensitive material consisting of three layers of, e.g., a conductive material, a photoconductive layer, and an insulative layer and is rotatably supported by a supporting member (not shown). A latent image is formed onto the photosensitive drum 29 by the modulated laser beam $L_a$.

Reference numeral 32 denotes a cleaning unit arranged near the drum 29; 33 a primary electrifier arranged so as to face the drum 29; 34 the secondary electrifier; and 35 a lamp to uniformly expose the drum 29. The lamp 35 is arranged so as to face the drum 29 together with the secondary electrifier 34. Reference numerals 36, 37, and 38 denote developing devices having developing agents of yellow, magenta, and cyan, respectively. The developing devices 36 to 38 are arranged near and below the drum 29. Reference numeral 39 denotes a cassette to feed a paper; 40 is a transfer material enclosed in the cassette 39 to feed a paper; 41 a paper feed roller; 42 a transfer drum whose diameter is the same as that of the drum 29; 43 a gripper which is provided for the transfer drum 42 and holds the front edge of the transfer material 40; 44 a cylinder notched portion formed on the transfer drum 42; and 45 a mesh screen made of polyester of about 70 mesh which is attached in front of the cylinder notched portion 44. The transfer material 40 is wound around the mesh screen 45. A transfer electrifier 46 charges the surface of the transfer material 40 through opening portions of the mesh screen 45 and also charges the mesh screen 45. The transfer electrifier 46 transfers the image developed on the photosensitive drum 29 onto the transfer material 40 and also allows the transfer material 40 to be electrostatically adsorbed onto the mesh screen 45. Reference numeral 47 denotes a separating nail to separate the transfer material 40 from the transfer drum 42; 48 is a conveying belt to convey the separated transfer material 40; 49 a heating roller fixing device to heat and fix the transfer material 40 conveyed by the conveying belt 48; and 50 paper ejecting tray to collect the transfer material 40 which has passed through the fixing device 49.

In the color laser beam printer shown in FIG. 4, the latent image formed by the first latent image forming operation is developed by a yellow developing device 36 and transferred onto the transfer material 40. Subsequently, the latent image formed by the second latent image forming operation is developed onto the transfer material 40 wrapped around the transfer drum 42 by a magenta developing device 37 and transferred. Further, the latent image formed by the third latent image forming operation is developed by a cyan developing device 38 and transferred.

An image processing section C to perform the image processes in the apparatus and its peripheral circuits will now be described with reference to FIG. 6.

In the diagram, reference numerals 51, 52, and 53 denote CCD drivers to drive the CCDs 17, 18, and 19, respectively. The CCD drivers 51 to 53 photoelectrically convert the light images of blue (B), green (G), and red (R) into the electric signals, respectively. Reference numeral 54 denotes a shading correction circuit to correct the electric signals converted by the CCDs 17 to 19 in accordance with the characteristic of the light source, that is, the illumination distribution; 55 indicates a level correction circuit to correct the shading corrected chrominance signals in accordance with level adjustment parameters which are determined every area in an image, which will be explained hereinlater; 56 a γ (gamma) correction circuit to logarithm convert the level corrected chrominance signals; 57 a masking processing circuit to perform the color correction; 60 a multiple value processing circuit to time-sharingly perform the luminance modulation for one spot of the laser beam by the signal based on the data which is obtained by converting the concentration data derived from the front stage into the area concentration; 61 an invention control circuit to invert an output of the multiple value processing circuit 60 by a signal from a main unit control section 64, which will be explained hereinafter; 62 a laser driver to drive the semiconductor laser 23; 63 a sync control circuit to send sync signals to the CCD drivers 51 to 53, shading correction circuit 54, level correction circuit 55, γ correction circuit 56, masking processing circuit 57, dither processing circuit 59, and multiple value processing circuit 60, respectively; 64 the main unit control section to control the respective sections; and 80 a keyboard to input an instruction by an operator.

Figure 6:
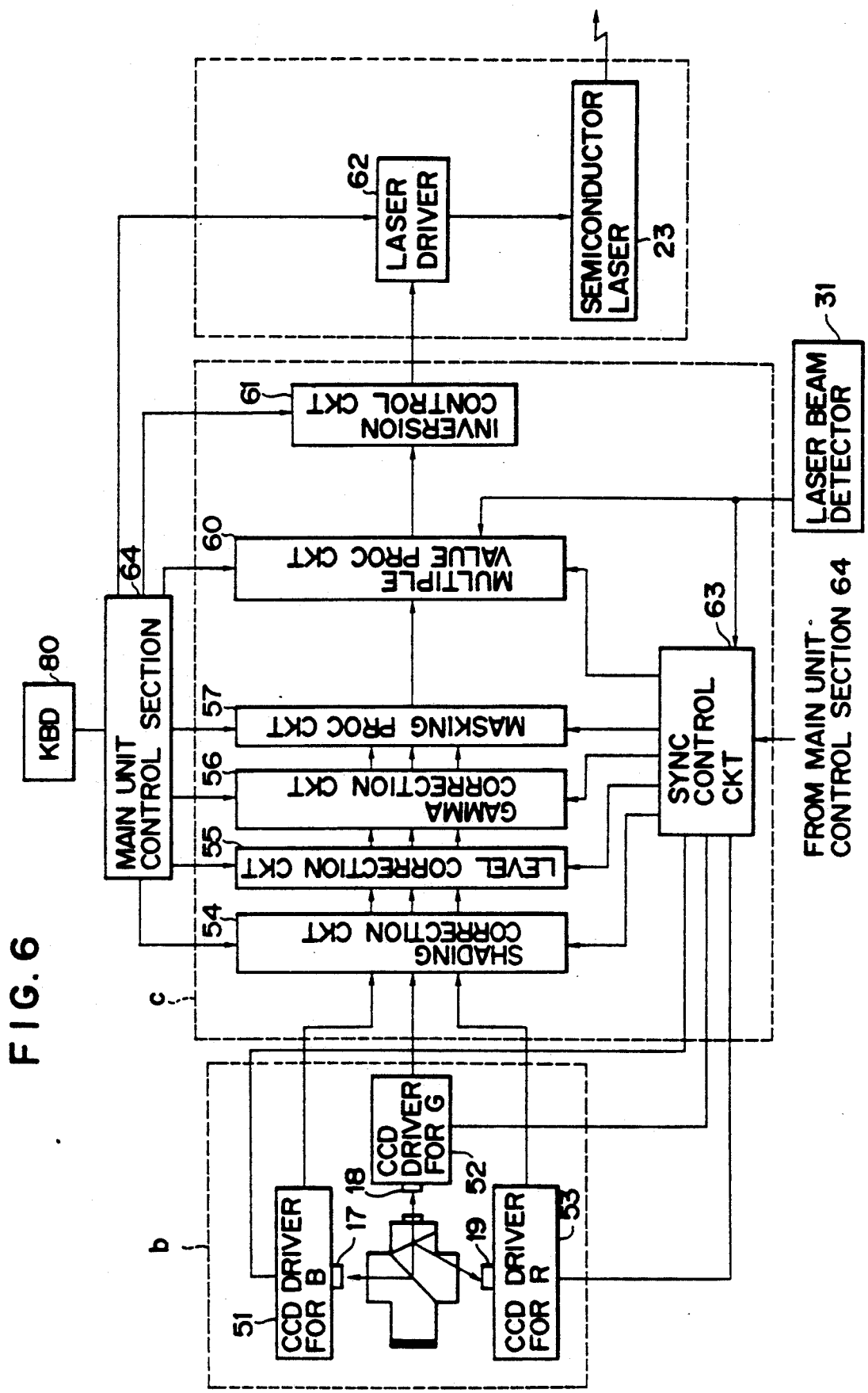
FIG. 6 is a block diagram of an image processing section according to an embodiment of the invention.
Figure 7:
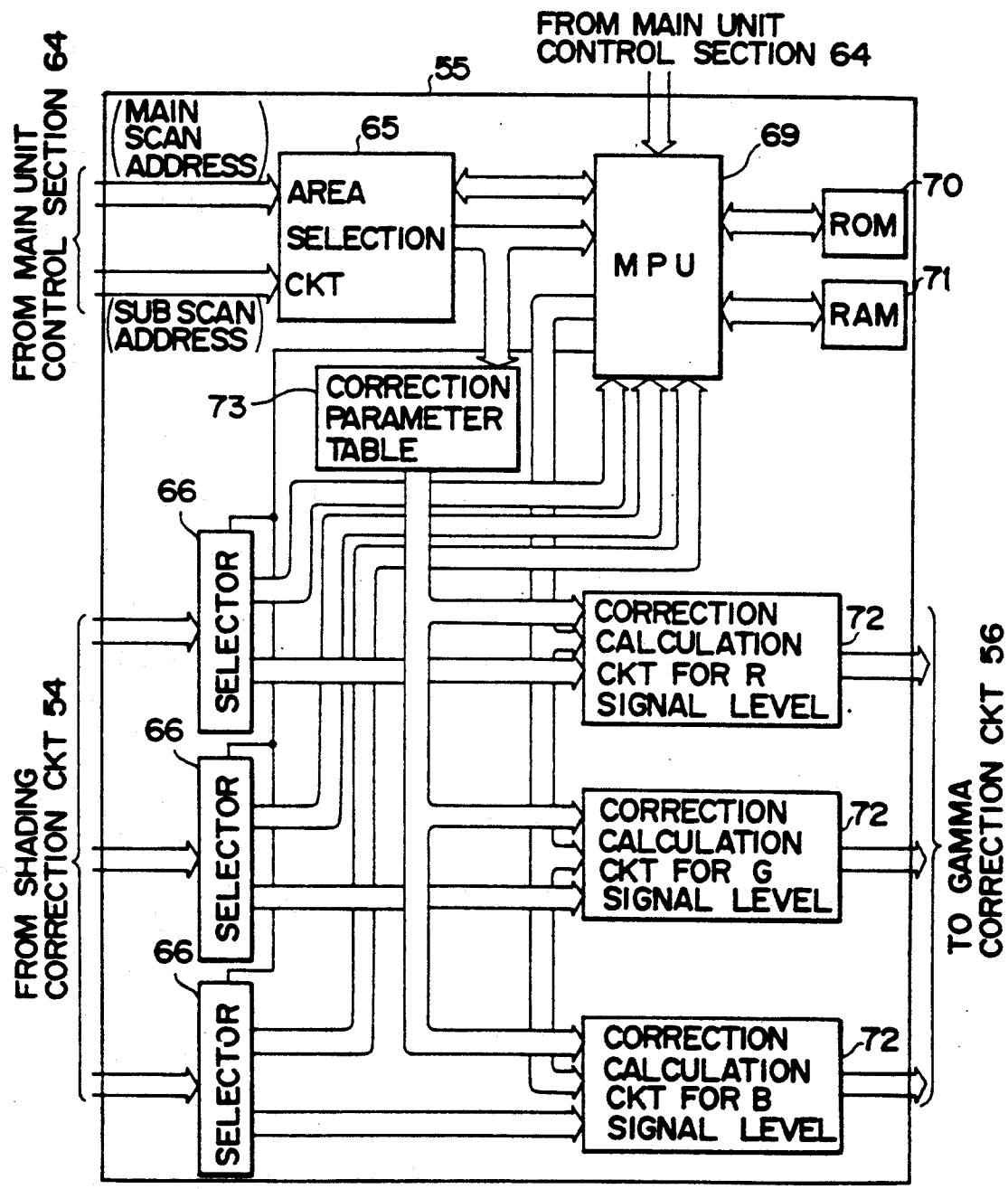
FIG. 7 is a block diagram of a level correction circuit according to an embodiment of the invention.

FIG. 7 is a block diagram showing an arrangement of the level correction circuit 55 in FIG. 6.

Figure 8:
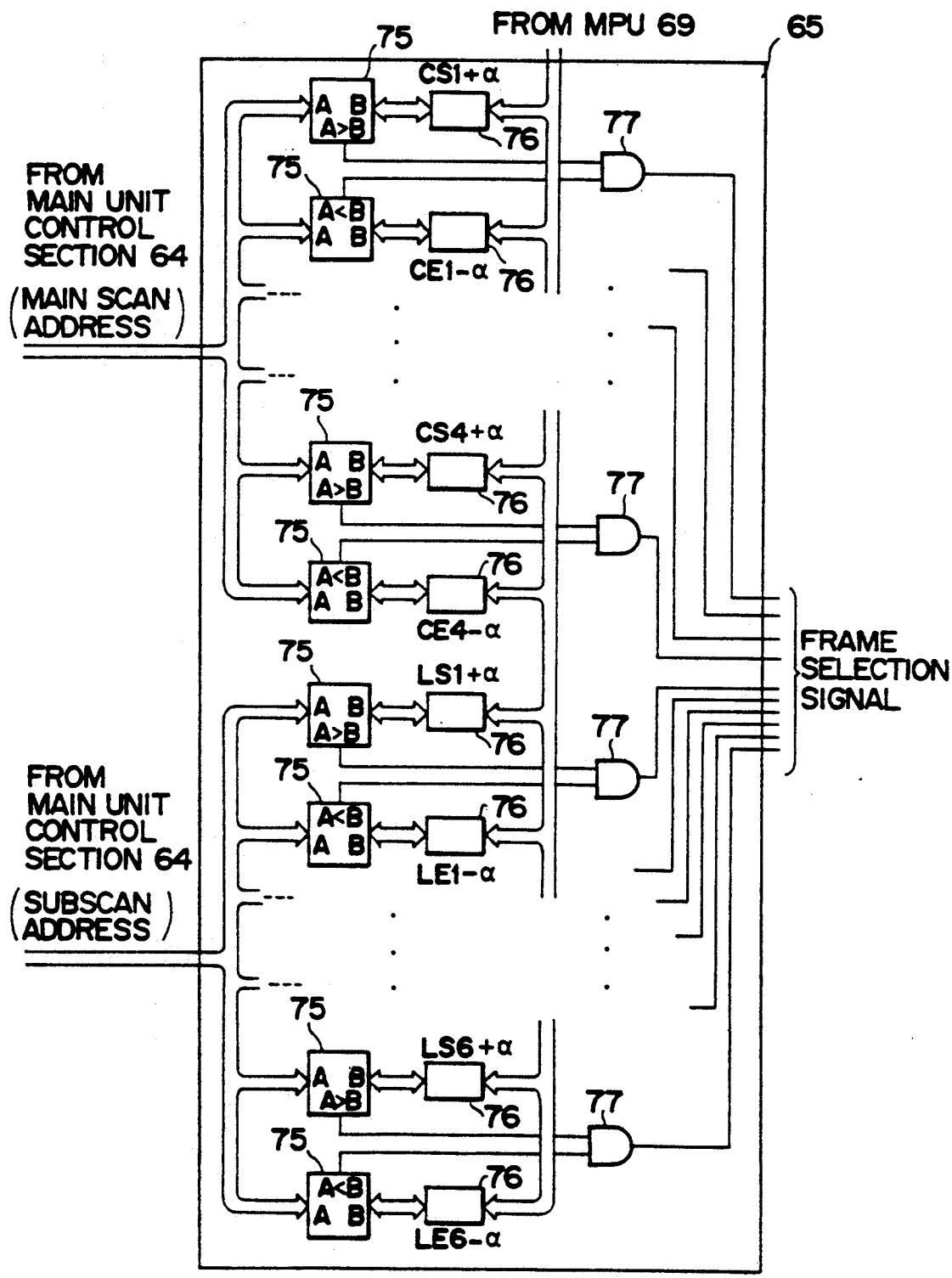
FIG. 8 is a block diagram of an area selection circuit according to an embodiment of the invention.

The main scan/subscan address which is sent from the main unit control section 64 is input to an area selection circuit 65. The area selection circuit 65 has an arrangement as shown in a block diagram of FIG. 8. Reference numeral 75 denotes a comparator and 76 is a latch to store a boundary value which can be rewritten by an MPU 69. The comparator 75 compares the main scan/subscan address input from the main unit control section 64 with the content of the latch 76 and outputs a signal indicating to which frame the address is located. Reference numeral 77 denotes a gate.

The MPU 69 in FIG. 7 performs the control of the level correction circuit 55, the arithmetic operation to calculate the average concentration of each frame, and the like. An ROM 70 stores the boundary value of each frame, a program for the arithmetic operations, and the like. The correction amounts for each frame and each color obtained by the arithmetic operations are stored in a correction parameter table 73. A selector 66 selects whether the data of R, G, and B sent from the shading correction circuit 54 are transmitted to level correction calculation circuits 72 for R, G, and B signal levels or to the MPU 69 on the basis of the control of the MPU 69. The level correction calculation circuit 72 is the section to perform the correction calculation to the image data which was actually read. In the prescan which will be explained hereinafter, the selector 66 is switched to the side of the MPU 69. In the main scan, the selector 66 is switched to the side of the level correction calculation circuit 72.

The relation between the area designation by the area selection circuit 65 and the position of each frame of the film on the film carrier 2 will now be described.

Figure 9A:
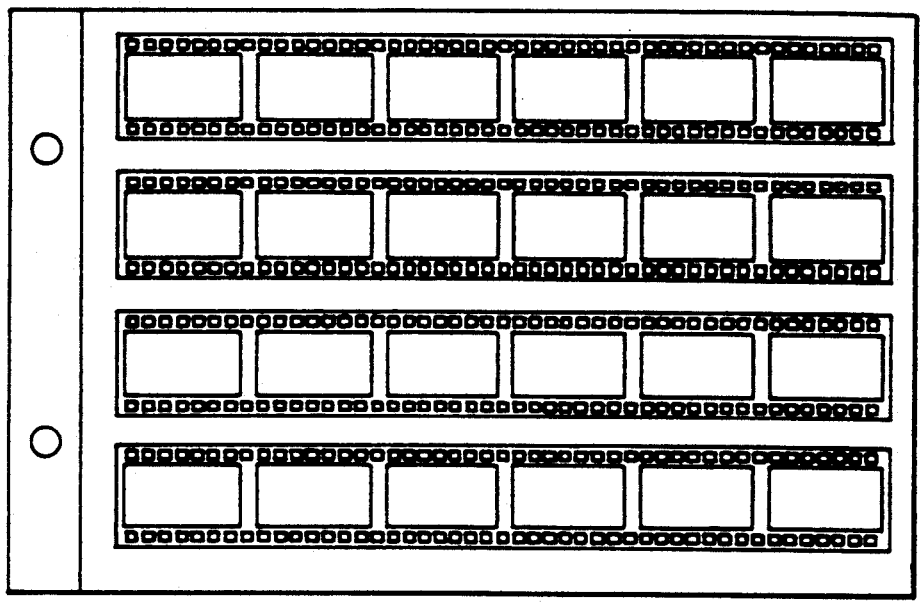
FIGS. 9A and 9B are diagrams for explaining a film original and an image position of each frame according to an embodiment of the invention.
Figure 9B:
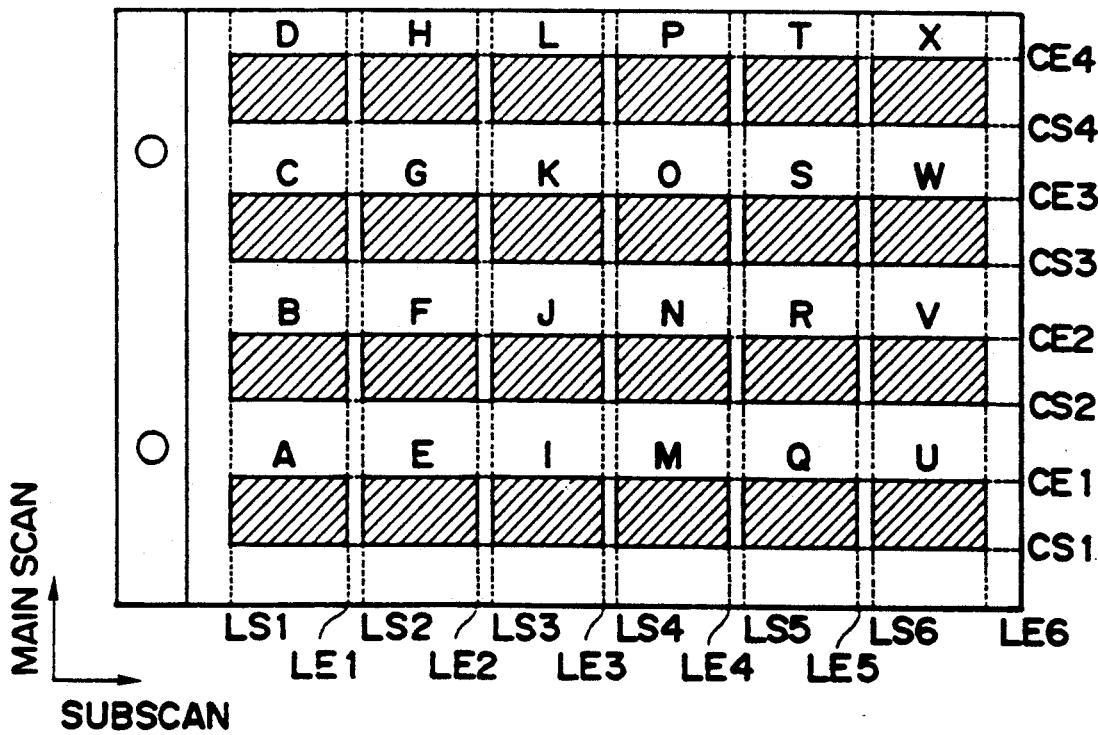

FIG. 9A is a plan view showing a state in which the film carrier 2 in which films are inserted is put on the original glass base plate 1. FIG. 9B shows areas on the films which are occupied by the actual images at that time. The hatched portions correspond to the image areas. For instance, a frame A corresponds to the area which is defined between addresses $CS_1$ and $CE_1$ in the main scanning direction and between addresses $LS_1$ and $LE_1$ in the subscanning direction. Values of addresses $CS_i$, $CE_i$, $LS_i$, and $LE_i$ ($i=1, 2, \ldots$) are preliminarily stored in the ROM 70 in the MPU 69. FIG. 10 is a partial enlarged diagram regarding the frame A. The range surrounded by solid lines denotes the hatched region of the frame A in FIG. 9B.

The region surrounded by broken lines is the area to collect the data when calculating the parameters for level correction (color tone correction) and is set so as to be smaller than the hatched region of the frame A by the following two reasons.

(i) When the correction data is obtained from the inside of the range surrounded by the solid lines, data of points out of the image of the frame are eventually referred due to the positional deviation of the films (variation when the films are cut every six frames).

(ii) In many cases, the main object to be photographed is located at the center of the frame.

The region surrounded by alternate long and short dash lines shows the area to perform the exposure level correction (color tone correction) of the frame and is set to be larger than the region surrounded by the solid line because of the following reason opposite to the foregoing reason (i).

(iii) When only the data in the region surrounded by the solid lines is corrected, there is a possibility such that the area which is not corrected appears around the image of the frame due to the positional deviation of the films.

The operation of the embodiment constructed as mentioned above will now be described. Prior to describing the operation, an image processing method in the apparatus of the embodiment will be first explained with reference to FIG. 1.

Figure 1:
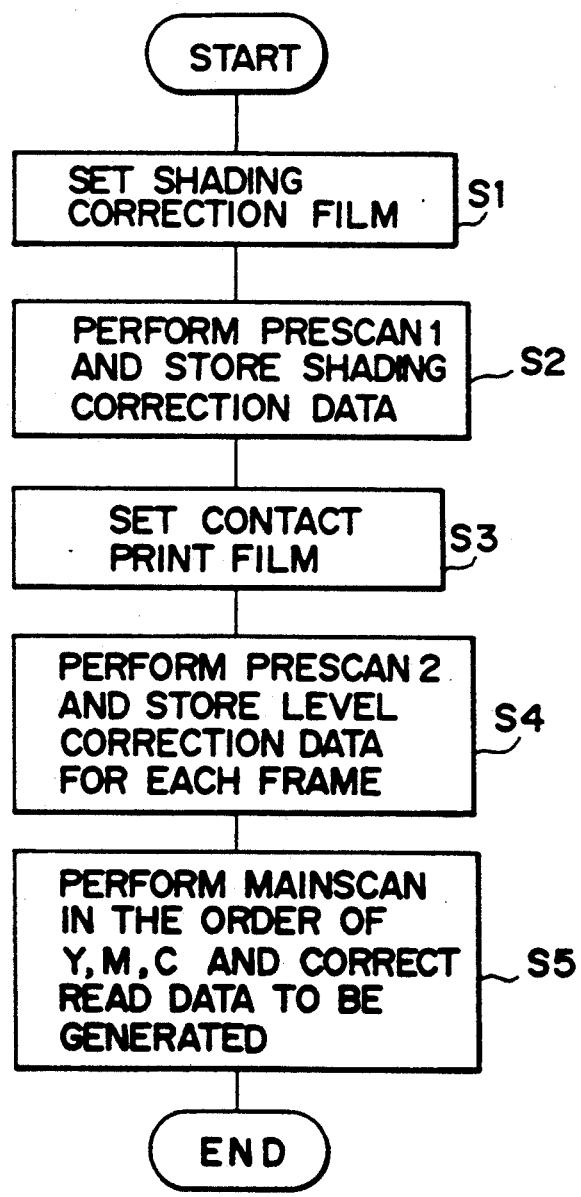
FIG. 1 is a flowchart showing the operation of an apparatus of an embodiment of the present invention.

FIG. 1 is a flowchart for the copying operation of a film original in the image processing apparatus of the embodiment.

The operator depresses a contact print film designating key on the keyboard 80 to designate the contact print of a film. Further, a correction film of only a base concentration having no image is set to the slide projector 3 (step S1). Then, a start key for the prescan 1 on the keyboard 80 is depressed. When the depression of the start key for the prescan 1 is detected, the main unit control section 64 executes the prescan 1 and the digital signal which is output from the CCD driver 52 for the G signal is stored into the RAM included in the shading correction circuit 54 (step S2).

For the positions near the center of each frame, the main unit control section 64 executes the sampling of the shading correction data for each frame shown in FIG. 9. That is, for example, for the frames A to D, the data of one line for the positions near the address $(LE_1 - LS_1)/2$ in the subscanning direction is read and stored as the shading data to the frames A to D. In a manner similar to the above, the above operations are also similarly executed for the frames E to H and the like.

In the subsequent prescan 2 and the main scan, the shading correction is executed on the basis of the data for each frame.

Next, the operator removes the correction film and sets the film whose contact print is to be obtained to the film carrier 2 shown in FIG. 5 (step S3). After the contact print film was set to the fixed position on the original glass base plate 1, a copy start key on the keyboard 80 is depressed. When the depression of the copy start key is detected, the main unit control section 64 executes the prescan 2 (step S4). The prescan 2 is executed in order to calculate the average concentration for each frame and to determine the exposure level for each frame and the color balance correction parameters.

The calculation of the average concentration will be described in detail hereinlater.

After the above processes were finished, the main scan is soon executed without waiting for the key input from the keyboard 80. The main scan is performed three times. The image processing section C sequentially performs the main scan in accordance with the order of yellow (Y) by the first scan, magenta (M) by the second scan, and cyan (C) by the third scan and outputs the read data to the laser driver 62. At this time, the read image data are corrected by the parameters obtained by the prescan mentioned above (step S5).

In the case of the recording section of the embodiment where the recording of different colors is repeated three times on one transfer material, the scan is executed three times. However, in the case of a recording apparatus which can simultaneously record different colors, data of a plurality of colors can be simultaneously output by the single scan. In the case of processing the read color image data and storing into a memory or in the case of storing the read color image data of one page into a memory and, thereafter, processing, it is sufficient to also similaly perform the scan only one time.

The operation in the apparatus of the foregoing embodiment will now be described. Almost of the light emitted from the light source 6 of the slide projector 3 shown in FIG. 2 is directed to the front side and a part of the light is reflected by the reflecting mirror 9 arranged at the rear side and is directed to the front side. Both of the lights are then converged by the capacitor lens 7 and pass through the projecting lens 8 and are reflected downwardly by the reflecting mirror 9 and projected onto the original glass base plate 1.

The projected image is read by the CCDs 17 to 19 shown in FIG. 2 and a series of image signals corresponding to one main scanning line are formed. The image signals are modulated in the image processing section C in FIG. 6 to thereby drive the semiconductor laser 23. The laser beam $L_a$ generated from the laser 23 which is driven by the image signals is expanded to the laser beam $L_a$ having a predetermined beam diameter by the beam expander 24 shown in FIG. 4 and input to the polyhedron reflecting mirror 25. When a plurality of reflecting mirrors of the polyhedron reflecting mirror 25 rotate at a predetermined speed by the constant velocity rotating motor 26, the incident laser beam $L_a$ is substantially horizontally scanned. The scanned laser beam $L_a$ passes through the image forming lens 27 and the slit 28 of the secondary electrifier 34 and is image formed as a spot light onto the photosensitive drum 29.

A part of the laser beam $L_a$ which passed through the image forming lens 27 is reflected by the mirror 30 and detected by the laser beam detector 31. On the basis of the detected signal, the sync control circuit 63 controls the timing for the modulating operation of the semiconductor laser 23 for giving predetermined light information onto the photosensitive drum 29. The drum 29 is previously cleaned by the cleaning unit 32. Then, the influence by the latent image which has already been formed is eliminated by an AC electrifier. Further, in association with the rotation in the direction indicated by an arrow in the diagram, the surface of the drum 29 is uniformly charged to the plus polarity by the primary electrifier 33. Thereafter, the drum 29 is scanned by the laser beam $L_a$ while performing the corona discharge of the minus polarity by the secondary electrifier 34. Further, the drum 29 is uniformly exposed by the lamp 35 and an electrostatic latent image is formed.

The latent image is developed by the developing device of the corresponding color among the developing devices 36 to 38 having yellow, magenta, and cyan developing agents. That is, the latent image is developed by the developing device 36 of yellow for the first scan. The transfer material 40 which has previously enclosed in the cassette 39 is fed by the paper feed roller 41 synchronously with the rotation of the drum 29. The front edge of the transfer material 40 is held by the gripper 43 of the transfer drum 42. The transfer material 40 is wrapped around the surface of the mesh screen 45 of the cylinder notched portion 44. The transfer electrifier 46 charges both of the surface of the transfer material 40 and the surface of the mesh screen 45 through the opening portion of the mesh screen 45. Thus, the developed image on the drum 29 is transferred onto the transfer material 40 and the transfer material 40 is electrostatically adsorbed to the surface of the mesh screen 45.

Further, for the second and third scans, the latent image is developed by the developing devices 37 and 38 of magenta and cyan. The developed image on the drum 29 is multiplexingly transferred onto the transfer material 40 wrapped around the transfer drum 42 with the positions of three color images matched. Thereafter, the gripper 43 is released and the separating nail 47 is made operative to separate the transfer material 40. Thus, the transfer material 40 is led to the heating roller fixing device 49 by the conveying belt 48 and the transferred image is heated and fixed. Thereafter, the transfer material 40 is ejected out to the paper ejecting tray 50.

The modulation of the laser beam $L_a$ will now be described. The data obtained by the prescan 2 is used for the modulation of the laser beam $L_a$.

As shown in the flowchart of FIG. 1, the prescan 2 is executed after completion of the prescan 1.

In the prescan 2, the MPU 69 of the level correction circuit shown in FIG. 7 switches the selector 66 for each color to the upper side, thereby allowing the shading corrected data which is input from the shading correction circuit 54 to be sent to the MPU 69. The MPU 69 receives both of the output data of the shading correction circuit 54 and the information indicating to which frame of the film carrier 2 the output data exists, that is, the output of the area selection circuit 65 and calculates the average concentration for each frame. Prior to starting the prescan 2, the MPU 69 previously sets the address value of the boundary of the level correction parameter calculation area shown by broken lines in FIG. 10 into each latch 76 of the area selection circuit 65 for the main scanning direction and subscanning direction for each frame.

For instance, an average value $AVE_{AR}$ of the R signal of the frame A is calculated as follows.

$$AVE_{AR} = \frac{\Sigma DATA[R(i,j)]}{\text{the number of parameter calculation area pixels}} \quad (1)$$

where $$LS_{1+\alpha} \leq i \leq LE_{1-\alpha}$$

$$CS_{1+\alpha} \leq j \leq CE_{1-\alpha}$$

DATA[R(i,j)] denotes data of R at the points of (the main scan address j and subscan address i)

The average value is calculated every chrominance signal of R, G, and B.

For instance, it is also possible to calculate the average value by thinning out every four pixels in order to reduce the load of the arithmetic operations.

Next, the MPU 69 compares the average value $AVE_{AR}$ obtained by the foregoing method with a predetermined average concentration STD which is derived from a standard original and is preliminarily stored in the ROM 70. The difference therebetween is used as a correction parameter. That is, a correction parameter $ADJ_{AR}$ of the frame A is obtained by $$ADJ_{AR} = STD - AVE_{AR} \quad (2)$$

A magnitude of the correction parameter has a predetermined range because of the following reasons. That is, when the correction amount is very large, this means that the frame is such that . the exposure is extremely insufficient or the overexposure occurs, so that the correction parameter exceeds the correctable range.

Even if the correction is simply performed by the correction amount obtained by the equation (2), no effect is eventually obtained.

Figure 11:
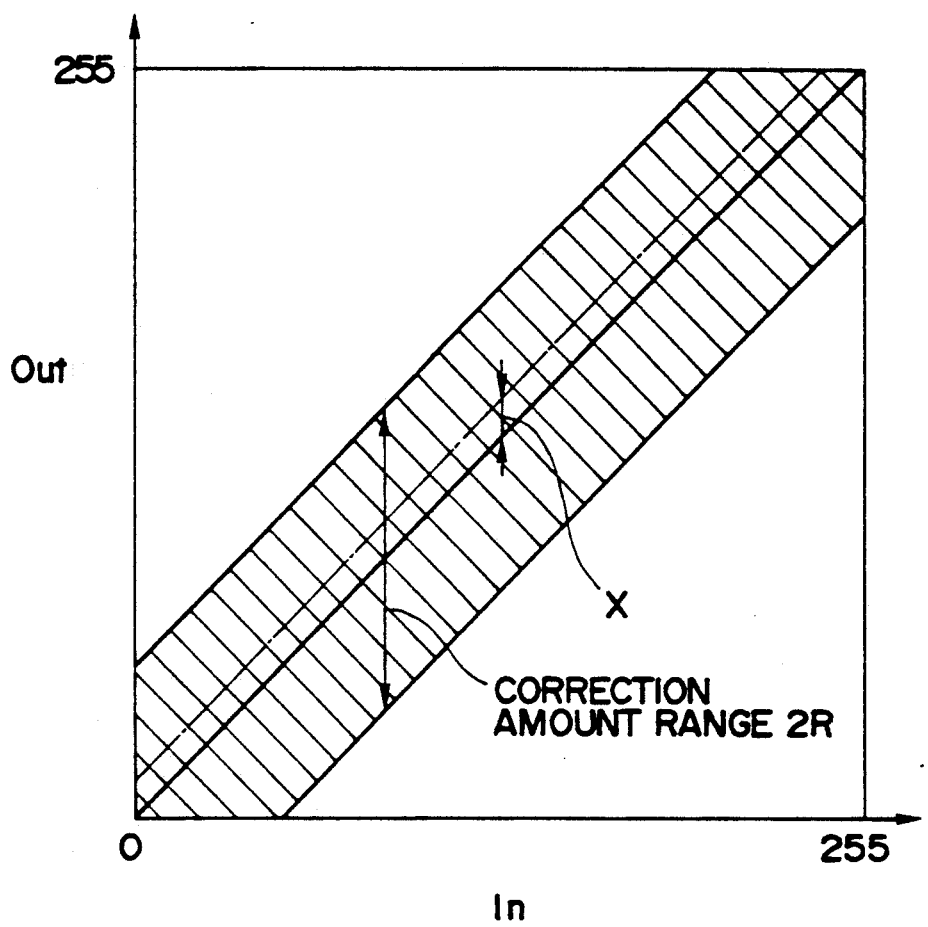
FIG. 11 is an explanatory diagram of the level correcting calculation.

FIG. 11 shows such a situation. An axis of abscissa denotes the data before correction and an axis of ordinate represents the data after correction. A solid line indicates the relation between the data before correction when the correction is not executed and the data after correction. As will be obvious from FIG. 11, when the value of the correction parameter ADJ is positive and the absolute value is very large, when the data before correction becomes a certain degree of value, the data after correction becomes a constant value of 255. Thus, it is impossible to accurately perform the correction.

On the other hand, in FIG. 11, an alternate long and short dash line represents the relation between the data before correction and the data after correction when the value of the correction parameter ADJ is X. The relation can be expressed by the following equation.

$$Out = MAX(0, MIN(In + X, 255)) \quad (3)$$

where, MAX(a, b) indicates a function representing the maximum value between a and b and MIN(a, b) denotes a function representing the minimum value between a and b.

The hatched region in FIG. 11 denotes a correctable range (2R). Namely, when considering the correction range, the equation (2) becomes $$ADJ_{AR} = MAX(-R, MIN(STD - AVE_{AR}, R)) \quad (4)$$

The MPU 69 stores the level correction parameters $ADJ_{AR}$, $ADJ_{AG}$, and $ADJ_{AB}$ for each frame and each color obtained as mentioned above into the correction parameter table 73 shown in FIG. 7. The prescan 2 is then finished.

An object to independently calculate and correct the level correction parameter every color is to correct the color tone of the image of the frame of each film.

That is, the image photographed under the fluorescent light has a color tone which is slightly green as a whole. When the average concentrations of the image are calculated, the average value of the data of green is larger than those of red and blue. Therefore, the correction parameter $ADJ_{AG}$ obtained by the equation (4) is also larger than $ADJ_{AR}$ and $ADJ_{AB}$. The result corrected by the equation (3) regarding green is also more corrected and the color tone of green is suppressed.

Finally, the main scan in step S5 in FIG. 1 is executed. First, the MPU 69 sets the address value indicative of the boundary in the main scanning/sub-scanning direction of the correction area as shown by an alternate long and short dash line in FIG. 10 into each latch 76 of the area selection circuit 65. The selector 66 is switched to the lower side, thereby allowing the data sent from the shading correction circuit 54 to be transmitted to the level correction calculation circuit 72. Thereafter, when the scan is started, the area selection circuit 65 outputs a frame selection signal by the address signal. In response to the frame selection signal, the MPU 69 sets the correction parameter for each frame and each color stored in the correction parameter table 73 into the level correction calculation circuit 72. The level correction calculation circuit 72 calculates the equation (3) with respect to the pixel data signal which is sent from the selector 66 and outputs the result to the gamma correction circuit 56. On the other hand, the level correction calculation circuit 72 outputs a white image signal with respect to all of the areas which are not selected by the area selection circuit 65. That is, the level correction calculation circuit 72 performs the trimming with respect to the selected frame, thereby correcting the color tone for every frame.

Thereafter, the data passes through the gamma correction circuit 56, masking processing circuit 57, and multiple value processing circuit 60 and is inverted by the inversion control circuit 61 in response to the signal from the main unit control section 64. Or, the data is directly sent to the laser driver 62 and modulates the semiconductor laser 23.

When the contact print of the film is indicated by the keyboard 80, the operator also designates by the keyboard 80 whether the film to be read is a negative or positive. When the reading of the negative film is indicated, the main unit control section 64 instructs the inversion control circuit 61 to perform the inversion. On the other hand, when the reading of the positive film is designated, the data is directly output without being inverted.

The foregoing main scan is repeated three times with respect to three colors of Y, M, and C and a single output image is completed.

As described above, according to the embodiment, there is provided means for calculating the average concentration for each frame of the film and for correcting the exposure level on the basis of the calculated average concentration. Therefore, the contact print in which the exposure levels are coincident every frame is obtained. Further, by performing the level correction every color, there is an advantage such that the contact print in which the color tones are also coincident for each frame can be derived.

In the foregoing embodiment, as the means for reading the color image data of the color original image, the three-color prism 16 and CCDs 17 to 19 shown in FIG. 3 for photoelectrically converting the image of the film put on the original glass base plate 1 have been used. However, the invention is not limited to such means for reading the image of the film put on the original glass base plate 1. For instance, a two-dimensional sensor called an area sensor can be also used.

On the other hand, the means for discriminating the color tones of a plurality of areas from the color image data output from the reading means has been constructed by the MPU 69 for obtaining the average value of each of the R, G, and B signals with respect to each area selected by the area selection circuit 65 in the prescan by the reading means and the correction parameter table 73 into which the correction parameter to calculate the difference between the resultant average value and the average concentration STD as shown in FIG. 11 is stored. However, many various modifications are possible as the means for discriminating the color tone. For instance, it is also possible to construct in a manner such that a signal indicative of the ratio among the average values of the R, G, and B signals is obtained or the signal indicative of the ratio between the R-Y and B-Y signals or the signal indicative of the ratios of R/G and B/G is obtained from the R, G, and B signals, and the levels of the signals are compared to thereby discriminating the color tones.

In the embodiment, an area which has previously been selected by the area selection circuit 65 has been used to discriminate the color tone of the color image data. However, the invention can be also applied to the case where the area can be variably set. That is, the area of the color image data can be automatically or manually changed in accordance with the size of color original image.

In other words, a plurality of patterns in which the number of frames, position, and size of frame differ are previously registered in the ROM 70 as patterns of the film carrier 2 and the operator is enabled to select an arbitrary pattern from those patterns by using the keyboard 80. Or, a plurality of microswitches are provided on the original glass base plate, convex portions corresponding to the kinds of film carriers are provided for a plurality of kinds of film carriers, the kind of film carrier is discriminated on the basis of the on/off state of each of the microswitches, and the main unit control section 64 selects an arbitrary pattern from the ROM 70. The operator can also designate an arbitrary area by the keyboard 80.

The level correction calculation circuit 72 in FIG. 7 has been used as means for performing the color tone correction every area for the color image data which is output from the reading means on the basis of the result of the discrimination of the discriminating means and the correcting process has been electrically performed. However, the invention is not limited to such a construction but the correcting process can be optically performed. That is, the reading state by the reading means, for instance, the color of the light which is irradiated onto a color image can be changed upon reading.

Although the present invention has been described with respect to the preferred embodiment, the invention is not limited to the foregoing embodiment but many modifications and variations are possible within the spirit and scope of the appended claims of the invention.

What is claimed is:

1. A color image processing apparatus comprising:
    reading means for reading through a single reading operation a color original image divided into a plurality of areas;
    generating means for generating position data representing a position of each of said plurality of areas in said color original image;
    discriminating means for discriminating a color tone of each area of said color original image; and
    correcting means for performing a color tone correction for each area on the basis of the color tone of each area discriminated by said discriminating means and the position data generated by said generating means, said each area being read through the single reading operation.

2. An apparatus according to claim 1, wherein said discriminating means discriminates the color tones of the plurality of areas of the color original image on the basis of an output of said generating means.

3. An apparatus according to claim 1, wherein said discriminating means performs the discrimination on the basis of a first reading operation by said reading means and
    said correcting means performs the correction on the basis of a second reading operation by the reading means.

4. An apparatus according to claim 1, wherein said discriminating means discriminates the color tones on the basis of an output of the reading means of each of the area and reference data.

5. An apparatus according to claim 1, wherein said correcting means limits a range of a correction amount for the color image data which is output from said reading means.

6. An apparatus according to claim 1, wherein said correcting means outputs white image data with respect to areas other than each of the areas whose color tones are corrected.

7. An apparatus according to claim 1, wherein said correcting means performs the correction for said reading means.

8. An apparatus according to claim 1, wherein said correcting means performs the correction or output signal of said reading means.

9. An apparatus according to claim 1, wherein said correcting means performs the color tone correction of said color original image by switching, based on said position data, a color tone correction value according to the discrimination by said discriminating means.

10. An apparatus according to claim 1, wherein said correcting means corrects the color tone of each area in parallel.

11. An apparatus according to claim 1, wherein said discriminating means discriminates the color tones of a plurality of areas of the color original image on the basis of an output of the reading means.

12. An apparatus according to claim 11, wherein said discriminating means discriminates the color tones of said plurality of areas of the color original image on the basis of the single reading operation of said reading means.

13. An apparatus according to claim 1, wherein said correcting means performs the correction with respect to an area including the peripheral regions around the area which was discriminated by said discriminating means.

14. An apparatus according to claim 13, wherein said generating means generates data representing a plurality of discriminating areas which are discriminated by said discriminating means and a plurality of correcting areas including the peripheral regions around said discriminating areas, said discriminating means discriminates the color tones of the discriminating areas, and said correcting means performs the color tone correction every correcting area on the basis of the discrimination output of the discriminating means.

15. An apparatus according to claim 1, further having recording means for recording a color image onto a recording paper on the basis of the color image data corrected by said correcting means.

16. An apparatus according to claim 15, wherein said recording means performs the recording of one color onto the recording paper by a single recording operation and records a color image by repeating the recording operation a plurality of times and said correcting means outputs the color image data corresponding to each of the recording operations.

17. An apparatus according to claim 1, wherein said reading means has exposing means for exposing a color film and photoelectric converting means for photoelectrically converting a transmitted light from the color film.

18. An apparatus according to claim 17, further comprising second generating means for generating correction data corresponding to a base concentration of the color film, and wherein said correcting means performs the color tone correction every area on the basis of outputs of said discriminating means and said second generating means.

19. An apparatus according to claim 1, wherein said reading means divides the color image data of the color original image into a plurality of color signals and outputs.

20. An apparatus according to claim 19, wherein said discriminating means obtains an average concentration of each of said plurality of color signals of said area and discriminates the color tones.

21. An apparatus according to claim 20, wherein said discriminating means discriminates the color tones on the basis of an average concentration corresponding to each of said plurality of color signals and a reference concentration and makes correction data for each of said plurality of color signals.

22. An apparatus according to claim 21, wherein when said correction data is substantially a predetermined value, said correcting means performs the color tone correction on the basis of said predetermined value.

23. A color image processing apparatus comprising:

reading means for reading a plurality of color images recorded on a color film by photoelectrically converting a transmission light from the exposed color film through a single reading operation;

first generating means for generating position data representing a position on the color film of each of said plurality of color images;

second generating means for generating correction data according to base density data of the color film;

discriminating means for discriminating color tone of each of said plurality of color images; and correcting means for performing a color tone correction for for said plurality of color images on the basis of said base density data generated by said second generating means, color tone of each of said plurality of color images discriminated by said discriminating means, and said position data generated by said first generating means.

24. An apparatus according to claim 23, wherein said second generating means generates correction data on the basis of a read output of said reading means for a base film.

25. An apparatus according to claim 23, wherein said discriminating means discriminates the color tone of the color original image on the basis of the output of said reading means for the color original image to be processed.

26. An apparatus according to claim 23, wherein said correcting means limits a range of a correction amount for the color image data which is output from said reading means.

27. An apparatus according to claim 23, wherein said correcting means outputs white image data with respect to areas other than each of the areas whose color tones are corrected.

28. An apparatus according to claim 23, wherein said discriminating means discriminates the color tones of said plurality of areas of the color original image on the basis of the single reading operation of said reading means.

29. An apparatus according to claim 23, wherein said correcting means performs the correction for said reading means.

30. An apparatus according to claim 23, wherein said correcting means performs the correction for output signal of said reading means.

31. An apparatus according to claim 23, wherein said discriminating means discriminates the color tone of a partial area of the image.

32. An apparatus according to claim 31, wherein said correcting means performs the correction with respect to an area including the peripheral regions around the area which was discriminated by said discriminating means.

33. An apparatus according to claim 31, wherein said discriminating means discriminates the color tones on the basis of an output of said reading means of a partial area of the color original image and reference data.

34. An apparatus according to claim 23, wherein said correcting means corrects said plurality of color images by switching, based on said position data, a color tone correction value according to the discrimination by said discriminating means.

35. An apparatus according to claim 23, wherein said correcting means performs the color tone correction of said plurality of color images read through a single reading operation of said reading means.

36. An apparatus according to claim 23, wherein said correcting means performs the color tone correction of said plurality of color images in parallel.

37. An apparatus according to claim 23, wherein said discriminating means discriminates the color tone by a first reading operation of said reading means, and said correcting means performs the color tone correction by a second reading operation of said reading means.

38. An apparatus according to claim 23, further having recording means for recording a color image onto a recording paper on the basis of the color image data corrected by said correcting means.

39. An apparatus according to claim 38, wherein said recording means performs the recording of one color onto the recording paper by a single recording operation and records a color image by repeating the recording operation a plurality of times and said correcting means outputs the color image data corresponding to each of the recording operations.

40. An apparatus according to claim 23, wherein said reading means divides the color image data of the color original image into a plurality of color signals and outputs.

41. An apparatus according to claim 40, wherein said discriminating means obtains an average concentration of each of said plurality of color signals of said partial area and discriminates the color tone.

42. An apparatus according to claim 41, wherein said discriminating means discriminates the color tones on the basis of an average concentration corresponding to each of said plurality of color signals and a reference concentration and makes correction data for each of said plurality of color signals.

43. An apparatus according to claim 42, wherein when said correction data is substantially a predetermined value, said correcting means performs the color tone correction on the basis of said predetermined value.

44. An image processing apparatus comprising:
setting member for setting a film including a plurality of frame;
reading means for reading, through a single reading operation, a plurality of images recorded on each frame included in the film by photoelectrically converting a transmission light from each frame;
setting means for setting position data representing a position on the film of each of said plurality of frames;
generating means for generating correction data for each of said plurality of frames of the film; and
correcting means for performing a correction for each frame on the basis of said correction data and said position data.

45. An apparatus according to claim 44, wherein said generating means generates correction data in accordance with an output of said reading means based on each frame and reference data.

46. An apparatus according to claim 44, wherein said generating means generates correction data on the basis of a read output of said reading means for a base film.

47. An apparatus according to claim 44, wherein said correcting means limits a range of a correction amount for the color image data which is output from said reading means.

48. An apparatus according to claim 44, wherein when said correction data is substantially a predetermined value, said correcting means performs the color tone correction on the basis of said predetermined value.

49. An apparatus according to claim 44, wherein said correcting means outputs white image data with respect to areas other than the corrected areas whose color tones are corrected.

50. An apparatus according to claim 44, wherein correcting means performs the correction for said reading means.

51. An apparatus according to claim 44, wherein said correcting means performs the correction for output signal of said reading means.

52. An apparatus according to claim 44, wherein said generating means generates said correction data on the basis of the single reading operation of said reading means.

53. An apparatus according to claim 44, wherein said correcting means corrects each frame with switching said correction data based on said position data.

54. An apparatus according to claim 44, wherein said generating means generates the correction data according to an image of a part of area in the area to which said correction specified by said position data is performed.

55. An apparatus according to claim 44, wherein said correcting means corrects each frame in parallel.

56. An apparatus according to claim 44, wherein said reading means performs the reading operation by scanning the transmitted light from the film of said plurality of frames set on said setting member, and
said generating means generates the correction data for each of said plurality of frames of the film on the basis of a single scan of said reading means.

57. An apparatus according to claim 44, further having recording means for recording a color image onto a recording paper on the basis of the image data corrected by said correcting means.

58. An apparatus according to claim 57, wherein said recording means performs the recording of one color onto the recording paper by a single recording operation and records a color image by repeating the recording operation a plurality of times and
said correcting means outputs the color image data corresponding to each of the recording operations.

59. An apparatus according to claim 44, wherein said setting means sets a color film, and said reading means reads color images.

60. An apparatus according to claim 59, wherein said generating means discriminates the color tones of said plurality of frames of the color film and generates the color tone correction data.

61. An apparatus according to claim 59, wherein said reading means divides the color image data of the color original image into a plurality of color signals and outputs.

62. An apparatus according to claim 61, wherein said generating means generates correction data in accordance with an average concentration of each of said plurality of color signals.

63. An apparatus according to claim 61, wherein said generating means generates correction data in accordance with an average concentration corresponding to each of said plurality of color signals and a reference concentration.

64. A color image forming apparatus comprising:
image forming means for forming a plurality of color images on one forming medium through a single forming operation;
input means for inputting a plurality of color images to be formed on said image forming medium;
generating means for generating position data representing a position of each of said plurality of color images;
discriminating means for discriminating a color tone of each of said plurality of color images input by said input means; and
correcting means for correcting said plurality of color images input by said input means, on the basis of each color tone discriminated by said discriminating means and said position data generated by said generating means, wherein said image forming means forms said plurality of color images corrected by said correcting means on said one forming medium.

65. An apparatus according to claim 64, wherein said input means inputs the color images from an image reader.

66. An apparatus according to claim 64, wherein said discriminating means discriminates the color tones of respective predetermined areas in said plural color images specified by said position data.

67. An apparatus according to claim 64, wherein said correcting means performs the correction with respect to an image including the peripheral regions around the image which was discriminated by said discriminating means.

68. An apparatus according to claim 64, wherein said correcting means performs the color tone correction in synchronism with the forming operation of said image forming means.

69. An apparatus according to claim 64, wherein said correcting means corrects said plurality of color images input by said input means, with witching a color tone correction value based on said position data.

70. An apparatus according to claim 64, wherein said correcting means corrects said plurality of color images in parallel.

71. An apparatus according to claim 64, wherein said generating means generates the position data representing the respective positions on said one forming medium to which said plurality of color images are to be formed.

72. An apparatus according to claim 64, wherein said forming means forms the color image on a paper.

73. An apparatus according to claim 72, wherein said forming means has a laser beam printing unit.

74. A color image forming method wherein plural color images are formed on one image forming medium, said method comprising the steps of:

inputting position data representing a position on the one image forming medium to which the plural color images are to be formed;

discriminating a color tone of each of the plural color images on the basis of a characteristic of each of the plural color images;

correcting the color tones of the plural color images respectively on the basis of the discriminated color tones and the position data; and outputting the plural color-tone-corrected color images to a forming unit which forms the plural color images on the one image forming means.

75. An apparatus according to claim 74, wherein in said outputting step, the forming unit form the plural color images on the one image farming medium by repeating recording of one color through a single recording operation.

76. A method according to claim 74, wherein in said correcting step the color tones of the plural color images are corrected on the basis of the position data by switching a correction value based on the respective color tones.

77. A method according to claim 74, wherein in said discriminating step the color tone of a part of the plural color images to be corrected in said correcting step is discriminated.

78. A method according to claim 74, wherein said inputting step further comprises the step of:

inputting area data representing a pair of area in plural correction areas specified by the position data, and in said discriminating step the color tone of the area represented by the area data is discriminated.

79. A method according to claim 74, wherein the forming unit forms the color images on the one image forming medium in a color electrophotographic process.

80. A method according to claim 74, wherein in said correcting step the respective color tones of the plural color images are corrected in parallel.

81. A method according to claim 74, wherein in said inputting step the position data representing the positions on the one image forming medium to which the plural color images are to be formed is input.

* * * * *

UNITED STATES PATENT AND TRADEMARK OFFICE
CERTIFICATE OF CORRECTION

PATENT NO. : 5,233,414
DATED : August 3, 1993
INVENTOR(S) : Toshihiro Kojima

It is certified that error appears in the above-identified patent and that said Letters Patent is hereby corrected as shown below:

Column 2, line 2, change "prisms" to --prism--; and
line 54, delete "be".

Column 3, line 25, change "lights" to --light--.

Column 7, line 33, change "similaly" to --similarly--; and
line 35, change "Almost" to --Most--.

Column 8, line 17, change "has" to --was--.

Claim 8, column 12, line 47, change "or" to --for--.

Claim 23, column 14, line 4, change "for for" to --for--.

Claim 50, column 15, line 67, change "correcting" to --said correcting--.

UNITED STATES PATENT AND TRADEMARK OFFICE
CERTIFICATE OF CORRECTION

PATENT NO. : 5,233,414
DATED : August 3, 1993
INVENTOR(S) : Toshihiro Kojima

It is certified that error appears in the above-identified patent and that said Letters Patent is hereby corrected as shown below:

Claim 69, column 17, line 28, change "witching" to --switching--.

Claim 75, column 18, line 14, change "form" to --forms--.

Signed and Sealed this

Nineteenth Day of April, 1994

Attest:

BRUCE LEHMAN

Attesting Officer    Commissioner of Patents and Trademarks